US009574429B2

(12) United States Patent
Hart

(10) Patent No.: US 9,574,429 B2
(45) Date of Patent: Feb. 21, 2017

(54) HYDROCARBON MOBILITY AND RECOVERY THROUGH IN-SITU COMBUSTION WITH THE ADDITION OF AMMONIA

(71) Applicant: Nalco Company, Naperville, IL (US)

(72) Inventor: Paul R. Hart, Fresno, TX (US)

(73) Assignee: Nalco Company, Naperville, IL (US)

( * ) Notice: Subject to any disclaimer, the term of this patent is extended or adjusted under 35 U.S.C. 154(b) by 115 days.

(21) Appl. No.: 14/241,390

(22) PCT Filed: Sep. 21, 2012

(86) PCT No.: PCT/US2012/056494
§ 371 (c)(1),
(2) Date: Feb. 26, 2014

(87) PCT Pub. No.: WO2013/043975
PCT Pub. Date: Mar. 28, 2013

(65) Prior Publication Data
US 2014/0224483 A1 Aug. 14, 2014

Related U.S. Application Data

(60) Provisional application No. 61/537,107, filed on Sep. 21, 2011.

(51) Int. Cl.
*E21B 43/16* (2006.01)
*E21B 43/243* (2006.01)
*C09K 8/592* (2006.01)
*C09K 8/594* (2006.01)

(52) U.S. Cl.
CPC ............ *E21B 43/168* (2013.01); *C09K 8/592* (2013.01); *C09K 8/594* (2013.01); *E21B 43/243* (2013.01)

(58) Field of Classification Search
CPC ...... E21B 43/243; E21B 43/168; E21B 43/24; E21B 43/305; E21B 43/16; E21B 43/2406; C09K 8/592; C09K 8/594; C09K 8/58; C10G 21/28; C10G 2300/203
See application file for complete search history.

(56) References Cited

U.S. PATENT DOCUMENTS

| | | | | |
|---|---|---|---|---|
| 3,578,781 A * | 5/1971 | Abrams | ................. | C09K 8/607 166/305.1 |
| 4,342,657 A * | 8/1982 | Blair, Jr. | ............ | B01D 11/0288 166/303 |
| 4,410,216 A | 10/1983 | Allen | | |
| 4,679,627 A * | 7/1987 | Harrison | ............... | E21B 43/168 166/177.1 |
| 5,985,137 A | 11/1999 | Ohsol et al. | .................. | 208/263 |
| 2003/0173072 A1* | 9/2003 | Vinegar | .................... | B09C 1/02 166/66.5 |
| 2009/0194278 A1 | 8/2009 | De Francesco | | |
| 2010/0012331 A1 | 1/2010 | Larter et al. | | |
| 2012/0028341 A1* | 2/2012 | Heerze | .................... | C10G 31/00 435/281 |
| 2012/0132564 A1* | 5/2012 | Hardacre | ................ | C10G 21/27 208/14 |
| 2013/0081809 A1* | 4/2013 | Stehle | ..................... | C09K 8/588 166/272.6 |
| 2014/0224483 A1* | 8/2014 | Hart | ........................ | C09K 8/592 166/261 |
| 2015/0191659 A1* | 7/2015 | Anderson | .............. | C10G 31/08 204/168 |

FOREIGN PATENT DOCUMENTS

WO   WO2011/090924   7/2011

* cited by examiner

*Primary Examiner* — Daniel P Stephenson
(74) *Attorney, Agent, or Firm* — Senniger Powers LLP

(57) ABSTRACT

Air and ammonia gas are introduced into a subterranean formation during the in-situ combustion to increase the mobility of hydrocarbons in a subterranean formation and facilitate recovery of the hydrocarbons from the subterranean formation. The air supports in-situ combustion of a portion of the hydrocarbon within the subterranean formation to form water and establish a combustion front. The ammonia gas contacts the hydrocarbons ahead of the combustion front and reacts in-situ with naphthenic acid in the hydrocarbon to form a surfactant. The hydrocarbons, water and surfactant then form an oil-in-water emulsion that drains more freely through the formation. A production well, in fluid communication with the hydrocarbons ahead of the combustion front, may be used to remove the oil-in-water emulsion from the subterranean formation.

9 Claims, No Drawings

HYDROCARBON MOBILITY AND RECOVERY THROUGH IN-SITU COMBUSTION WITH THE ADDITION OF AMMONIA

BACKGROUND

Field of the Invention

The present invention relates to hydrocarbon recovery from a subterranean formation using in-situ combustion.

Background of the Related Art

Heavy hydrocarbons are often too viscous to be produced using only the formation pressure. One method of lowering the viscosity of heavy hydrocarbons in subterranean formations is to flood the formation with steam. Steam increases the temperature of the hydrocarbons in the formation, which lowers their viscosity, allowing the hydrocarbons to drain or be swept towards a producer well. Steam also condenses into water, which can then act as a low viscosity carrier phase for emulsified oil, thereby allowing heavy hydrocarbons to be more easily produced.

An alternative to adding steam generated on the surface is to generate steam and other hot gasses downhole by burning a portion of the heavy oil reserve. This method of recovering heavy oil via in-situ combustion is often referred to as "fire flooding." One of the more advanced in-situ combustion techniques, known as "toe to heel air injection" ("THAI"), combines horizontal producing wells with vertical air injector wells. The process begins by circulating steam in both wells so that the oil between the wells is heated enough to flow to the lower, horizontal production well. The steam chamber heats and drains oil as the steam fills in the formerly oil-bearing pores between the wells. Steam circulation in the production well is then stopped and air is injected into the vertical injection well only. Oxygen in the air ignites the oil, generating heat and combustion gasses: CO and/or $CO_2$ (carbon oxides), and $H_2O$ (steam). A combustion gas chamber now begins to develop outwards from the injection well. As the hot gases permeate the formation, more oil is heated and cracked, reducing its viscosity and allowing it to flow downward along the combustion front boundary into the production well by way of gravity.

In-situ combustion offers a number of advantages in comparison with alternate thermal recovery methods such as "steam flooding" or "steam assisted gravity drainage" (SAGD). For example, in-situ combustion does not require an ongoing external source of fuel to heat water to steam, or an ongoing source of water to heat into steam. This results in dramatic reductions in energy and water treatment costs.

However, the in-situ combustion process is not entirely without drawbacks. For example, as heavy oil or bitumen is heated by gasses ahead of the advancing combustion front, individual droplets or pockets of oil can melt, flow, and fuse into an oil-continuous layer. Initial, incomplete combustion of the oil also forms oxygenates, like alcohols and organic acids, which adsorb onto the formation minerals, oil-wetting them, and thus promoting an oil continuous layer. Hot combustion gases follow the path of least resistance, divert around this oil continuous layer, and heat only the surface of the oil continuous layer that is facing the flame front before exiting through the producing well.

Heating the oil surface that is facing the flame front causes the oil at this surface to fractionate into lighter distilled hydrocarbons that are driven ahead, and heavier residual hydrocarbons that are left in place. For example, in Athabasca oilsand bitumen, in-situ distillation up to 370° C. leaves as much as 70% of the bitumen behind as a viscous tar. At this temperature, the alkyl side chains on the polynuclear aromatic cores of the bitumen molecules crack off and leave behind semi-solid asphalt. The heaviest asphaltic material forms between 525° C. and 565° C. This is an amorphous, sticky material that continues to crack, condense, and dehydrogenate into a hard, glassy, non-porous wall of coke. Iron compounds in the oil can act as powerful catalysts to accelerate this coking.

This wall of coke, once formed, can impede the flow of heat so much that temperatures in excess of 500° C. on the fire side produce less than 27° C. on the production side. Moreover, the wall channels most of the injected air directly into the producing well, slowing the burn rate to a small fraction of that needed to economically advance the fire flood. Unfortunately, there is no known method to dissolve or disperse this wall of coke once formed. It is often necessary to drill a new injector well, either into the coke to burn it off or on the other side of the coke to bypass the wall. However, drilling another well is expensive and does not prevent the formation of a further wall.

BRIEF SUMMARY

One embodiment of the present invention provides a method for increasing the mobility of hydrocarbons in a subterranean formation. The method comprises initiating in-situ combustion of a portion of the hydrocarbon within a subterranean formation to establish a combustion front, and introducing air and ammonia gas into the subterranean formation during the in-situ combustion, wherein the ammonia gas contacts the hydrocarbons ahead of the combustion front and reacts in-situ with naphthenic acid in the hydrocarbon to form a surfactant.

Another embodiment of the present invention provides a method for recovering hydrocarbons from a subterranean formation, the method comprising: introducing steam into the subterranean formation; and then introducing air and ammonia gas into the subterranean formation, wherein the air supports in-situ combustion of a portion of the hydrocarbon within a subterranean formation to form water and establish a combustion front, wherein the ammonia gas contacts the hydrocarbons ahead of the combustion front and reacts in-situ with naphthenic acid in the hydrocarbon to form a surfactant, and wherein the hydrocarbons, water, and surfactant form an oil-in-water emulsion; and using a production well in fluid communication with the hydrocarbons ahead of the combustion front to remove the oil-in-water emulsion from the subterranean formation.

DETAILED DESCRIPTION

One embodiment of the present invention provides a method for increasing the mobility of hydrocarbons in a subterranean formation. The method comprises initiating in-situ combustion of a portion of the hydrocarbon within a subterranean formation to establish a combustion front, and introducing air and ammonia gas into the subterranean formation during the in-situ combustion, wherein the ammonia gas contacts the hydrocarbons ahead of the combustion front and reacts in-situ with naphthenic acid in the hydrocarbon to form a surfactant.

Ammonia ($NH_3$) is an inorganic compound that boils at −28° F. at a pressure of 1 atmosphere. The present invention introduces ammonia gas into the subterranean formation during in-situ combustion, but the ammonia is able to pass through the combustion front and into contact with the hydrocarbons ahead of the front because ammonia is non-flammable. Accordingly, it is preferable to use a source of ammonia gas that is substantially free from amines and other flammable or combustible compositions. Combustible compositions, such as amines, will burn up within the combustion front and are therefore ineffective for any purpose ahead of the combustion front. Furthermore, an in-situ combustion process involves a long and tortuous path through a dry-pore steam/air chamber to the water condensation/oil draining front that is ahead of the combustion front. Even the smallest aerosol is unlikely to penetrate these pores.

In-situ combustion processes require the introduction of air (the oxidant) in order to burn hydrocarbons (the fuel). Accordingly, the present methods introduce ammonia gas into the formation along with the air during in-situ combustion in order to increase the mobility of the hydrocarbons along the combustion front. Because the ammonia gas is non-flammable, the ammonia gas may pass through the combustion front into contact with the hydrocarbons ahead of the front. The combustion reaction consumes oxygen in the air and a portion of the hydrocarbons in the formation, and produces combustion gasses, such as carbon oxides (CO and $CO_2$) and water vapor ($H_2O$). Although the air carrying the ammonia may be consumed, the combustion gasses carry the ammonia past the flame front into contact with hydrocarbons within the formation. There, the water vapor may condense to form liquid water.

The ammonia gas comes into contact with the hydrocarbons ahead of the combustion front and reacts in-situ with naphthenic acid in the hydrocarbons to form surfactants. These surfactants are water-wetting and oil emulsifying, thereby facilitating the formation of an oil-in-water emulsion between the hydrocarbons ahead of the combustion front and liquid water, such as the water that has condensed out of the combustion gasses. The oil-in-water emulsion has a much lower viscosity that an oil continuous phase, such that the emulsion drains efficiently from the formation. Desirably, this prevents the creation of an oil-continuous layer that can turn into an impermeable wall of coke, blocking the transfer of heat and gases.

The surfactants formed in-situ by delivery of ammonia into the formation serve to enhance and accelerate the release of the oil from (or inhibit the adsorption of the oil to) the mineral in the formation and suspend the bitumen in the water condensed from the steam. Heavy oil, in general, can often be transported faster by suspension in water than it can flow at its own viscosity or that of a water-internal emulsion. Since the present invention allows faster transport of oil in an oil-in-water emulsion and prevents the formation of a gas barrier, the combustion front advances through the formation faster and accelerates the production of oil.

It should be recognized that ammonia gas may also be introduced into the formation carried by steam or other carrier gases during various other processes or phases, such as a steam flood performed prior to initiating the in-situ combustion or after the in-situ combustion has been completed. When steam is used to carry ammonia into the formation, the steam is preferably substantially free from liquid water, since ammonia dissolves in liquid water and the liquid water will not pass as quickly through the pores in the formation.

The ammonia gas may be used in any concentration that is effective to improve the mobility of the hydrocarbons ahead of the combustion front. However, the ammonia concentration in the carrier gas is preferably from about 50 to about 50,000 ppm by weight, and most preferably from about 1,000 to about 10,000 ppm by weight.

Another embodiment of the present invention provides a method for recovering hydrocarbons from a subterranean formation. The method comprises introducing steam into the subterranean formation, and then introducing air and ammonia gas into the subterranean formation. As described above, the air supports in-situ combustion of a portion of the hydrocarbon within a subterranean formation to form water and establish a combustion front. The ammonia gas contacts the hydrocarbons ahead of the combustion front and reacts in-situ with naphthenic acid in the hydrocarbon to form a surfactant. The surfactant forms an oil-in-water emulsion between the hydrocarbons and water. A production well in fluid communication with the hydrocarbons ahead of the combustion front is used to remove the oil-in-water emulsion from the subterranean formation.

In an optional configuration, the air and the ammonia gas are introduced into the subterranean formation through an injection well. In another optional configuration, the air and the ammonia gas are introduced into the subterranean formation through an injection well, and the production well is a horizontal well disposed below the injection well.

Once the oil-in-water emulsion has been produced out of the formation through the production well, the method may further comprise breaking the oil-in-water emulsion to separate the hydrocarbons from the water. Mechanical means, chemical emulsion breakers, or other methods known in the art may be used to break the emulsion and facilitate separation of the hydrocarbon phase from the aqueous phase. For example, the emulsion may be broken using polyamine, polyether, metal hydrate, or acid based emulsion breakers or "reverse emulsion" breakers ahead of various separation vessels.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for recovering hydrocarbons from a subterranean formation, comprising:

introducing steam into the subterranean formation; and then introducing air and ammonia gas into the subterranean formation, wherein the air supports in-situ combustion of a portion of the hydrocarbon within a subterranean formation to form water and establish a combustion front, wherein the ammonia gas contacts the hydrocarbons ahead of the combustion front and reacts in-situ with naphthenic acid in the hydrocarbon to form a surfactant, and wherein the hydrocarbons, water and surfactant form an oil-in-water emulsion thereby suspending the hydrocarbons in the water;

using a production well in fluid communication with the hydrocarbons ahead of the combustion front to remove the oil-in-water emulsion from the subterranean formation; and breaking the oil-in-water emulsion to separate the hydrocarbons from the water.

2. The method of claim 1, wherein the ammonia gas is substantially free from amines.

3. The method of claim 1, wherein the air and the ammonia gas are substantially free from combustible compositions.

4. The method of claim 1, wherein the steam includes ammonia gas.

5. The method of claim 4, wherein the steam is substantially free from liquid water.

6. The method of claim 1, wherein the air and the ammonia gas are introduced into the subterranean formation through an injection well.

7. The method of claim 1, wherein the air and the ammonia gas are introduced into the subterranean formation through an injection well, and wherein the production well is a horizontal well disposed below the injection well.

8. The method of claim 1, wherein the ammonia concentration in the air is from about 50 to about 50,000 ppm by weight.

9. The method of claim 1, wherein the ammonia concentration in the air is from about 1,000 to about 10,000 ppm by weight.

* * * * *